United States Patent [19]

Costa

[11] Patent Number: 5,076,038
[45] Date of Patent: Dec. 31, 1991

[54] CONTAINER FOR SLIDES AND APPARATUS FOR AUTOMATICALLY PACKAGING THE SLIDES

[75] Inventor: Gianluigi Costa, Vicenza, Italy

[73] Assignee: Tecnodia S.p.A., Valdagno, Italy

[21] Appl. No.: 524,973

[22] Filed: May 18, 1990

Related U.S. Application Data

[60] Division of Ser. No. 241,333, Sep. 6, 1988, Pat. No. 4,434,532, which is a continuation of Ser. No. 928,383, Nov. 10, 1986, abandoned.

[30] Foreign Application Priority Data

Nov. 11, 1985 [IT] Italy .................. 61951/85[U]
Nov. 11, 1985 [IT] Italy .................. 84152 A/85

[51] Int. Cl.⁵ .................... B65B 9/04; B65B 67/04
[52] U.S. Cl. .................... 53/266.1; 53/284.2; 53/284.7; 53/246; 53/374.8
[58] Field of Search ............ 53/246, 252, 51, 258, 53/564, 567, 568, 570, 520, 266 R, 373, 266.1, 284.7, 284.2, 378.8

[56] References Cited

U.S. PATENT DOCUMENTS

| | | | |
|---|---|---|---|
| 3,788,031 | 1/1974 | Florjancic | 53/252 X |
| 3,872,645 | 3/1975 | Dorman | 53/570 X |
| 3,896,603 | 7/1975 | Tout | 53/570 X |
| 4,055,933 | 11/1977 | Getsch | 53/570 |
| 4,139,978 | 2/1979 | Jensen et al. | 53/564 X |
| 4,139,980 | 2/1979 | Larson et al. | 53/568 X |
| 4,331,260 | 5/1982 | Euteneuer et al. | 53/520 X |
| 4,391,082 | 7/1983 | Diesch | 53/520 |
| 4,548,018 | 10/1985 | Wojnicki | 53/51 |
| 4,787,766 | 11/1988 | Lörsch | 53/520 X |

Primary Examiner—Horace M. Culver
Attorney, Agent, or Firm—Hoffman, Wasson & Gitler

[57] ABSTRACT

An apparatus for automatically packaging mounted slides in a continuous strip container having laterally opening pockets includes a mechanism for positioning each pocket opposite a slide insertion member, a device for incrementally feeding the strip past the insertion member, and a cutter for cutting the strip following slide insertion.

12 Claims, 3 Drawing Sheets

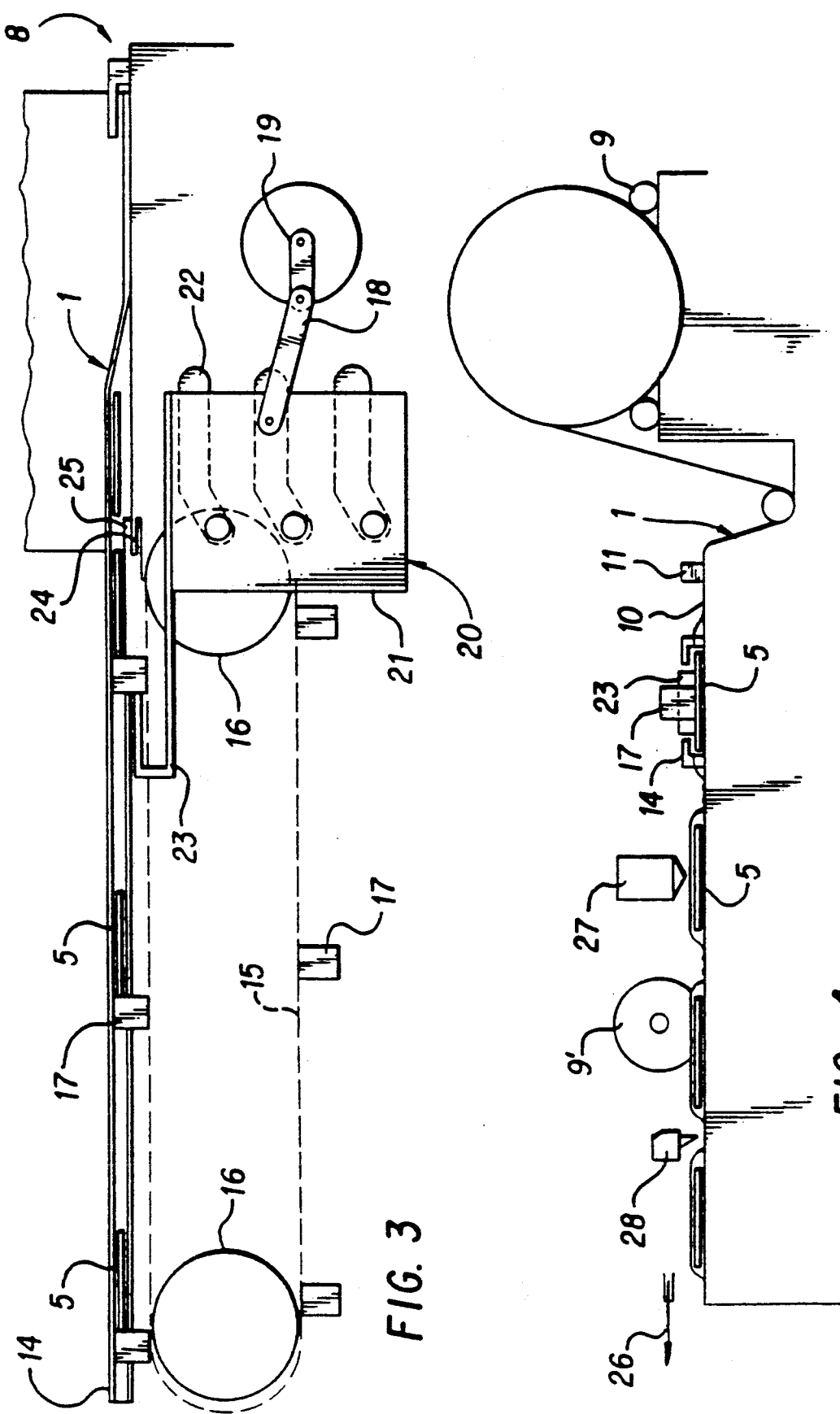

CONTAINER FOR SLIDES AND APPARATUS FOR AUTOMATICALLY PACKAGING THE SLIDES

This application is a division of U.S. Pat. No. 4,934,532, Ser. No. 241,333 filed Sept. 6, 1988, which was a continuation of application Ser. No. 928,383 filed Nov. 10, 1986, now abandoned.

BACKGROUND OF THE INVENTION

This invention relates to a container for slides and an apparatus for automatically packaging the slides in the container.

In photographic laboratories it is known to package the mounted slides originating from one and the same photographic film either in a rigid box or in a foldable display case comprising pockets.

When packaged in this manner, the slides are inserted into the socalled processing envelope, to be returned to the shop from which they came.

This box container has certain drawbacks, and in particular:

a size and weight which substantially affect transport and storage costs, the need to use one box for each photographic film, independently of the number of slides obtained from that film, a certain laboriousness in closing the box on termination of packaging, and a contribution in terms of cost per slide for this operation which is inversely proportional to the number of slides contained in the box, difficulty in inserting the box into the conventional processing envelope because of the size of said box, the inability of the user to view the slides without extracting them one by one from the box into which they have been inserted, the impossibility of filing the slides in ring-type holders.

The foldable display case with individual pockets substantially obviates the drawbacks of box containers, but has other drawbacks such as operational slowness deriving from the need to manually insert each slide into the corresponding pocket.

SUMMARY OF THE INVENTION

The object of the invention is to obviate the drawbacks jointly or separately present in known slide containers.

An other object of the invention is to allow automatic packaging of mounted slides, while overcoming the drawbacks of the known packaging methods using box-type containers or pocket-type containers.

These objects are attained according to the invention by a slide container characterised by consisting of a continuous strip of transparent material comprising a plurality of transverse pockets closed at one end and open at the other end, into which the predetermined number of slides can be inserted.

For automatically packaging the mounted slides in the container an apparatus is used, characterised by comprising:

a feeder for the continuous strip, means for successively positioning the various pockets of the continuous strip with their open end facing an insertion member for said slides, means for advancing said strip stepwise through a distance equal to the height of said pockets, after each of them has been filled with the predetermined number of slides, a cutter for transversely cutting the strip on termination of the packaging cycle.

BRIEF DESCRIPTION OF THE DRAWINGS

A preferred embodiment of the present invention is described in detail hereinafter by way of non-limiting example with reference to the accompanying drawings, in which:

FIG. 3 is a longitudinal section therethrough on the line III—III of FIG. 2,

FIG. 4 is a cross-section therethrough on the line IV—IV of FIG. 2, and

DESCRIPTION OF THE PREFERRED EMBODIMENTS

Figure 1:
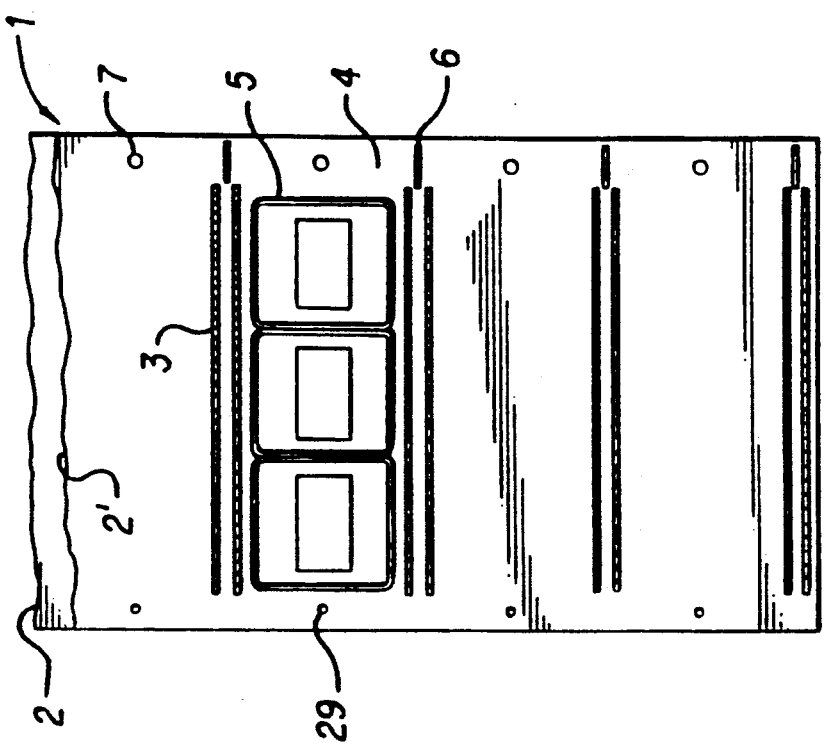
FIG. 1 is a plan view of a portion of a continuous strip according to the invention.

As can be seen from the figures, the container according to the invention is formed from a continuous strip 1 of transparent material, such as cellophane, polythene or other transparent film, folded longitudinally into two bands 2, 2' of the same width. In some cases it can be preferable for the two bands 2, 2' to be of different width, in that this can facilitate the opening-out of the aperture of each pocket 4 on inserting the slides 5 into it.

The strip 1 comprises a plurality of pairs of weld lines 3, the purpose of which is to define pockets 4 for housing mounted slides 5.

In order to allow easy separation of the side portions during insertion of the mounted slides 5, each pair of weld lines 3 stops before the free edge of the two folded side portions. In correspondence with the longitudinal crease in the strip 1, within the space delimited by the two weld lines of each pair, there are provided marks 6 which when suitably read by appropriate apparatus make correct automatic stepwise feed of the strip 1 possible for its synchronisation with the other packaging operations.

In correspondence with the longitudinal crease, the continuous strip 1 also comprises a plurality of holes 7 having a distance apart which is substantially equal to the standardised distance of the rings of ring-type holders.

The apparatus for automatically packaging the mounted slides in the container substantially comprises a bed 8 on which the various components are mounted. Specifically the bed 8 is provided with a roller assembly 9 for the continuous strip 1 and with a packaging table 10 along which the strip 1 advances, driven by pairs of rollers 9'. On the table 10 there is provided, in correspondence with the closed end of the pocket 4, an optical reader 11, for example of the photoelectric cell type, able to sense the presence of reference marks 6 printed on the strip 1.

A transfer line, indicated overall by 12, for the slides 5 originating from a conventional mounting apparatus 13, i.e. an apparatus which inserts the diapositives corresponding to the various photographs into rigid frames, for example of plastics construction, leads to the table 10 of the bed 8.

The transfer line 12 comprises essentially a pair of guide rails 14, along which the slides 5 can slide under the thrust of an endless conveyor 15 stretched between two sprockets 16 and carrying a plurality of drive blocks 17 of width less than the width of the mounted slides 5 and spaced apart by a distance greater than this width.

One sprocket 16 is disposed in proximity to the packaging table 10, and in correspondence with this there is disposed a mechanism comprising a connecting rod 18 and crank 19, this latter being connected to an insertion member 20 mobile in both directions parallel to the transfer line 12. Specifically, the insertion member 20 comprises a slider 21 slidable in guides 22 which are substantially horizontal with the exception of that portion thereof closest to the transfer line 12, in correspondence with which this portion is inclined downwards. A forked insertion element 23 is rigid with the slider 21 and consists essentially of a pair of horizontal fingers pointing towards the packaging table 10 and spaced apart by a distance greater than the width of the drive blocks 17, but less than the width of the mounted slides 5. An element for parting the two bands 2, 2' of the strip 1 is provided on said table 10 at the arrival position of the transfer line 12. Said parting element consists essentially of a slot 24 provided in a position slightly below the packaging table 10 to retain the lower side portion of the strip 1, and a pair of blocks 25 which form the front end of the guide rails 14 and raise the upper side portion of the strip.

Figure 2:
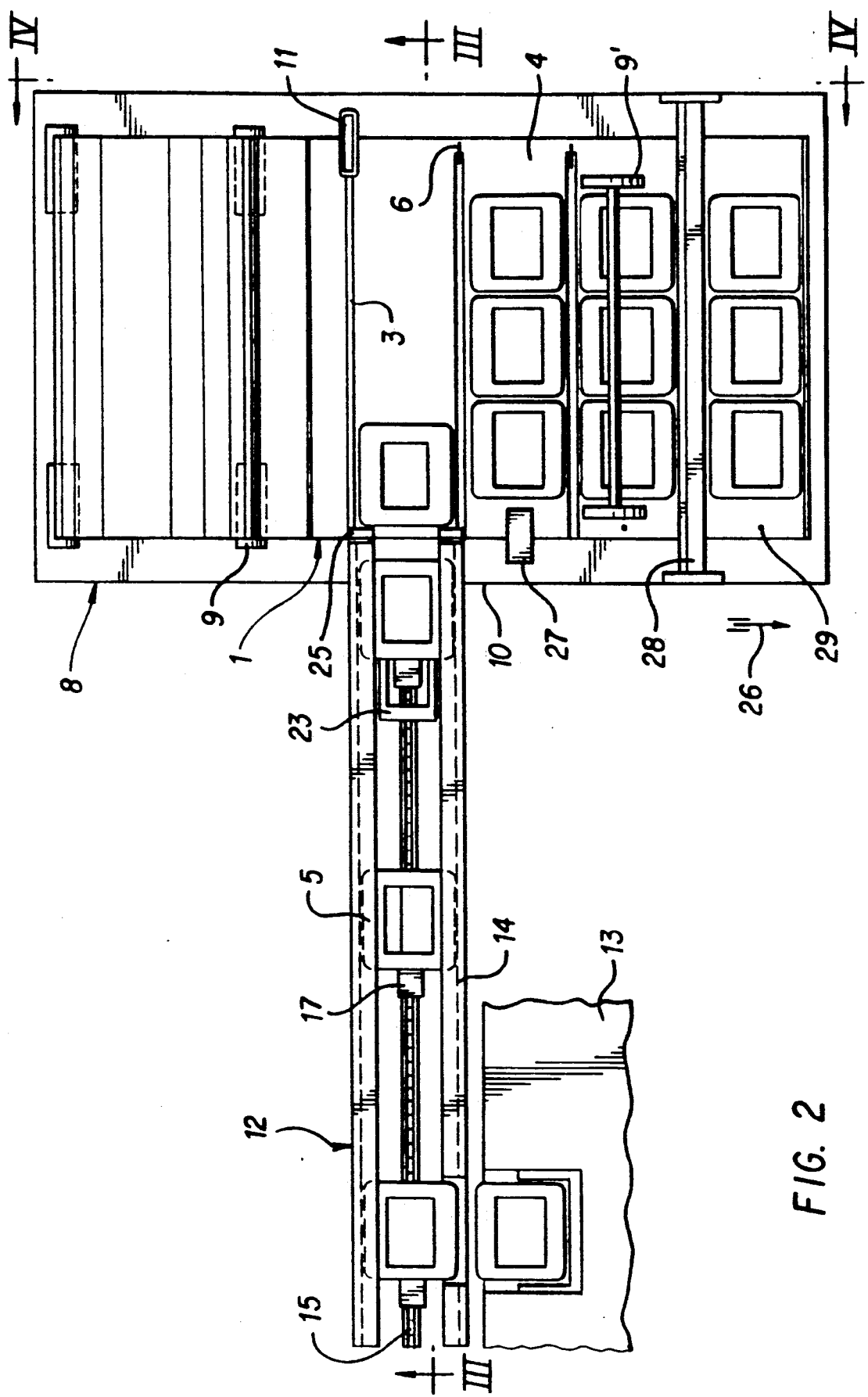
FIG. 2 is a diagrammatic plan view of an apparatus according to the invention for automatically packaging the mounted slides in the container.

Beyond the transfer line 12, with reference to the direction of advancement of the strip 1 indicated by the arrow 26 in FIGS. 2 and 4, there is also provided on the packaging table 10 a thermowelding device 27 arranged to act on the bands 2, 2' of the strip 1. A transverse cutter 28 is provided downstream of said thermowelding device 27.

The apparatus according to the invention also comprises a plurality of operating members (motors, actuators, etc.) and transmission members (belts, pulleys, gear wheels, etc.), together with automatic control devices (switches, counters, various controls etc.) which enable the processing cycle to be effected automatically and which have been neither illustrated nor described for simplicity of representation. They will however be referred to in the course of the following description of operation by simple mention of their presence, as they are of conventional type and as such are known to the skilled man.

The operation of the apparatus according to the invention can best be clarified by reference to a normal operating state, and specifically that in which an empty pocket 4 faces the transfer line 12, the device comprising the connecting rod 18 and crank 19 is at rest with the slider 21 positioned at the end of the inclined portion of the guides 22 (to the left with reference to FIG. 3), the forked insertion element 23 is positioned below the level of the guides 14, and the enless conveyor 15 is at rest with all those drive blocks 17 lying within the portion between the mounting apparatus 13 and the packaging table 10 resting against a forwardly positioned mounted slide 5, and in particular with one of these latter facing the aperture of the forwardly positioned pocket 4, which has its side portions kept spaced apart by the slot 24 and the end blocks 25 of the guides 14. Finally, the cutter 28 is in its raised position.

When in this state, an automatic command causes the crank 19 to rotate through 360°. Following this rotation, the connecting rod 18 causes the slider 21 of the insertion member 20 to undergo outward travel along the guide 22 towards the packaging table 10, followed by return travel to its initial position. During the initial portion of the forward travel, i.e. while the slider 21 slides along the inclined portion of the guides 22, the forked insertion element 23 not only advances but also rises as far as the level at which the slides 5 slide along the transfer line 12, and during the subsequent horizontal portion of its travel it inserts the slides 5 into the aperture of the pocket 4. During its return travel the forked element 23 after having travelled rearwards moves downwards to allow passage of the next slide 5 along the guides 14 above it.

It should be noted that because of the distance between the fingers of the forked insertion element 23, the drive block 17, although being at rest, does not hinder the movement of said forked insertion element 23.

The completion of this cycle causes a counter to advance through one unit, the purpose of this counter being to provide an output signal when the slides 5 inserted into one and the same pocket 4 reach the predetermined number.

After the insertion member 20 has returned to its initial position, the endless conveyor 15 is caused to advance through a distance equal to the distance between two successive drive blocks 17, so as to recreate the conditions for inserting the next slide 5 into the same pocket 4. The entry of this second slide causes the previously inserted slide to move forward through one position in the pocket 4, as the front edge of the second slide pushes against the rear edge of the first, and the completion of this second cycle causes the aforesaid counter to advance through one unit.

When the predetermined number of slides have been inserted into the pocket 4, i.e. when the counter has reached the previously set number (the number "3" in the described example), it provides an output signal which temporarily deactivates the transfer line 12 and instead operates the member which drives the strip 1. This strip therefore advances through a distance equal to the welding pitch, so as to position the next pocket 4 in front of the transfer line 12. Correct positioning of this pocket, with consequent stoppage of the drive member for the strip 1, is determined by the optical reader 11 which "senses" the presence of the reference mark 6. This advancement of the strip 1 through one step moves the previously filled pocket 4 into a position in which the side portions at its aperture are exactly below the thermowelding device 27, which joins them together with a weld spot 29, thus completely closing the pocket 4.

In the meantime, operation of the transfer line recommences for filling the next pocket, and so on.

When there are no more slides pertaining to that batch, or to that "order" in current terminology, this state is indicated to the apparatus according to the invention. This can be done automatically, for example by means of an optical reader positioned on the transfer line 12 in proximity to the packaging table 10, to sense the absence of slides. Alternatively, it can be done automatically for example by means of a signal provided by the mounting machine which will have previously counted the slides pertaining to that order, or it can be done manually.

In all cases, when the operations involved in packaging the slides pertaining to one and the same order have been completed, and independently of whether the last pocket has been filled completely or not, the strip 1 is advanced until the last pocket also comes under the action of the thermowelding device 27. The strip 1 is then again advanced until the last pocket has passed beyond the cutter 28, which is immediately operated to separate the already filled strip portion so that it can be fed to subsequent packaging operations.

In order to prevent wastage of material it is preferable for the transverse welds 3 forming the various pockets 4 to each consist of two parallel weld lines, between which the cutter 28 can act.

The apparatus according to the invention has for simplicity been described with the various parts being treated independently of each other and being operated one at a time, while the other parts remain at rest. It is however also possible by suitably synchronising the various parts to cause them to operate simultaneously, at least for some of them. Thus, in particular, it is possible for the transfer line 12 to move continuous, synchronised with the continuous movement of the device comprising the connecting rod 18 and crank 19, so that both can be driven by the same motor.

From the aforegoing it is apparent that the container according to the invention has considerable advantages both compared with conventional box containers and compared with conventional foldable display cases with pockets.

In this respect, compared with the former:

it is of very small overall size, which is advantageous both for storage and for its facility for being contained in conventional processing envelope, it requires a portion of strip which is effectively proportional to the number of slides to be packaged, it protects slides from finger prints and dust, it allows direct viewing of the slides, without extracting them from the container, it allows immediate filing in ring-type holders.

Compared with the latter, it allows the slide insertion to be automated.

Figure 5:
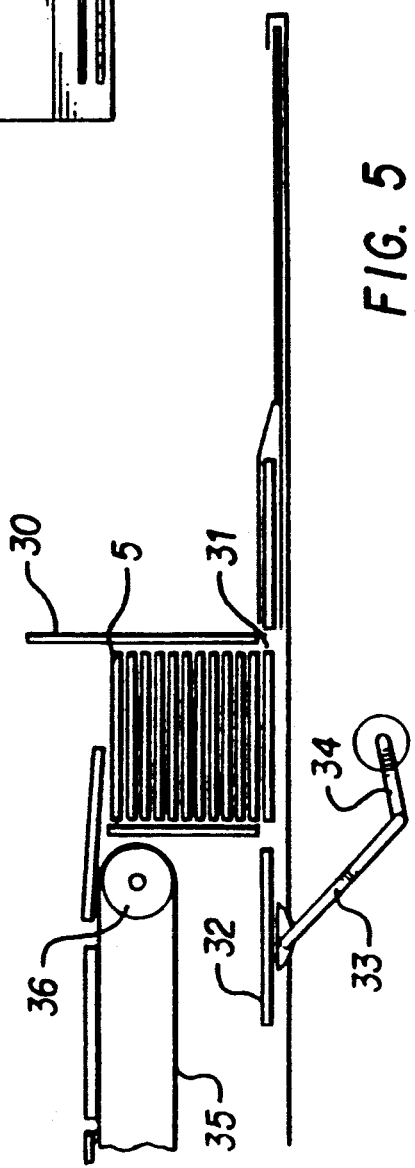
FIG. 5 is the same view as FIG. 3 of a second embodiment of the apparatus according to the invention.

In the embodiment shown in FIG. 5 the apparatus according to the invention comprises a store 30 for accumulating a pile of mounted slides 5. This store is placed facing the packaging table 10 and is provided with a lower slot 31 from which the slides can be extracted one by one and inserted into the container by a slider 32, actuated with reciprocating motion by a connecting rod 33-crank 34 system.

The slides 5 can be manually inserted into the container as a set of slides belonging to a same order, or can be carried along a conveyor belt 35 guided on rollers 36.

I claim:

1. An apparatus for automatically packaging mounted slides in a container formed from a continuous strip of material, having a series of transversal pockets laterally open at one end at a height slightly higher than the slides and at a width allowing the placement of a plurality of slides within each pocket, each of said pockets separated from adjacent pockets by a first pair of welds above each of the pockets and a second pair of welds below each of the pockets, so that the pitch between adjacent pockets of the strip is substantially equal to the distance between the center of one of the first pair of welds and the center of the second pair of welds, comprising an inserting device for inserting a plurality of mounted slides into each of said pockets, at least one of each slides being pushed by an adjacent slide into one of said pockets, means for feeding the continuous strip lengthwise in increments equal to the pitch between adjacent pockets in succession opposite said insertion device, and a cutter for transversely cutting the strip between a pair of said welds on termination of the packaging cycle.

2. The invention of claim 1, further comprising a thermowelding device arranged to close each pocket downstream of said insertion device.

3. The invention of claim 1, wherein said feeding means comprises one or more pairs of rollers on a bed for driving the continuous strip.

4. The invention of claim 3, wherein said strip is provided with optically readable marks placed between the welds of each of said pair of welds, and wherein said apparatus further comprises an optical reader, attached to said bed, for sensing the marks present on the continuous strip.

5. The invention of claim 1, wherein said insertion device comprises a slider driven by a mechanism comprising a connecting rod and crank, and a forked insertion element which is mobile, at least for a certain distance, coplanar with the movement of the slides towards the strip material.

6. The invention of claim 5, wherein the forked insertion element is formed from a pair of fingers spaced apart by a distance greater than the width of each drive block, but less than the width of the slides, said insertion element being kept at rest below the plane along which the slides slide, and being mobile along said plane during the insertion of the slides into the pockets of the strip material.

7. The invention of claim 1, wherein each of said welds stop before the edge of the strip corresponding to the opening of each pocket, thereby creating two superimposed spaced edges, further comprising a bed supporting both a packaging table on which the continuous strip slides, a transfer line with longitudinal guides for the mounted slides, and means for parting of the opening of each pocket as it faces the transfer line.

8. The invention of claim 7, wherein said transfer line comprises an endless conveyor provided with blocks for driving individual slides along guide rails towards the packaging table.

9. The invention of claim 7, wherein the means for parting of each pocket comprises a terminal part of said guide rails, above which the upper side portion of the continuous strips passes, and a slot below said guide rails, in which the lower side portion of said strip is guided.

10. The invention of claim 7, further comprising a store for accumulating slides in the transfer line.

11. The invention of claim 10, further comprising an insertion element actuated by a connecting rod and crank system to transfer the lowermost slide from the store toward the strip material.

12. The invention of claim 10, further comprising a conveyor belt connecting a slide mounting apparatus with the store.

* * * * *